Dec. 9, 1924.

J. E. S. SHEPHERD

MEANS FOR FILLING BATTERY PLATES

Filed Sept. 5, 1922

1,518,226

INVENTOR.
JESSE E. S. SHEPHERD.
BY
ATTORNEYS.

Patented Dec. 9, 1924.

1,518,226

UNITED STATES PATENT OFFICE.

JESSE E. S. SHEPHERD, OF INDIANAPOLIS, INDIANA.

MEANS FOR FILLING BATTERY PLATES.

Application filed September 5, 1922. Serial No. 586,380.

*To all whom it may concern:*

Be it known that I, JESSE E. S. SHEPHERD, a citizen of the United States, and a resident of Indianapolis, county of Marion, and State of Indiana, have invented a certain new and useful Means for Filling Battery Plates; and I do hereby declare that the following is a full, clear, and exact description thereof, reference being had to the accompanying drawings, in which like numerals refer to like parts.

This invention relates to a pasting machine for filling the grid of a battery plate with chemically treated or active paste.

The main object of the invention is to provide a machine for feeding the paste to the plate and forcing it into the interstices thereof from both sides of the plate thereby completely filling the corners as completely upon one side as the other.

One feature of the invention resides in the means for smoothing and cleaning the surface of the plate after having been filled in such manner as to eliminate any roughening effect which might be caused by the usual scraper.

The full nature of this invention will be understood from the accompanying drawings and the following description and claims.

Figure 1:
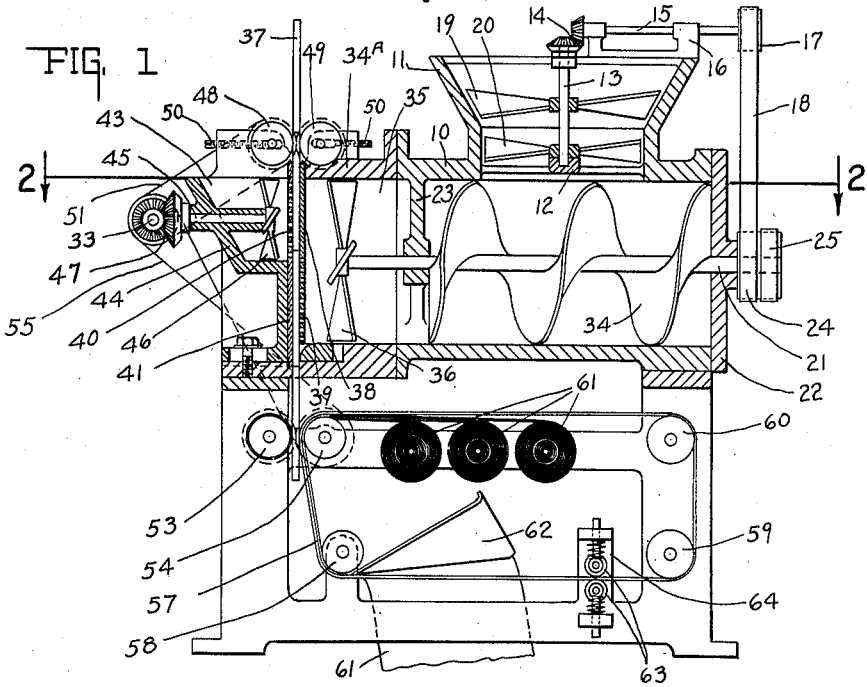
Figure 2:
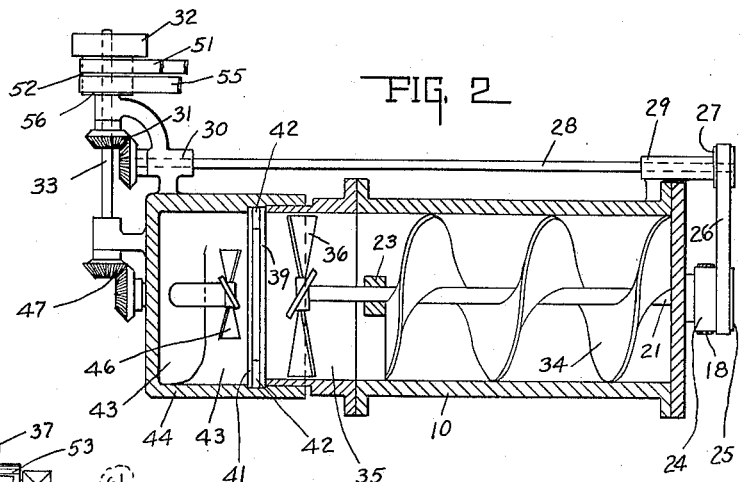
Figure 3:
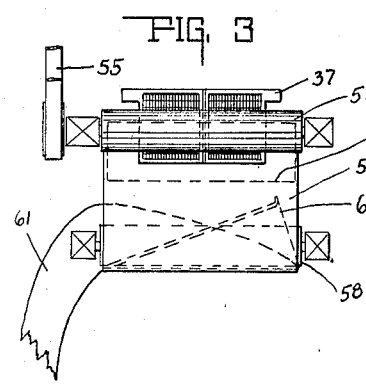

In the drawings Fig. 1 is a central vertical section through the machine. Fig. 2 is a section taken on the line 2—2 of Fig. 1. Fig. 3 is a front elevation of the smoothing and cleansing mechanism.

In the drawings there is shown a feeding cylinder 10 having a hopper 11 mounted on the top thereof into which the prepared paste may be placed for feeding into the plates. Vertically mounted in the hopper 11 and supported upon the bearing 12 there is a shaft 13 which is driven through the bevel gears 14 by the shaft 15 mounted horizontally in the bearings 16 supported on top of the hopper. The shaft 15 is driven through the pulley 17 by the belt 18. Secured upon the shaft 13 so as to revolve within the hopper there are feeding blades 19 and 20 mounted one above the other. The plates 19 and 20 are so turned as to force the paste downwardly through the mouth of the hopper into the cylinder 10. Horizontally mounted in the cylinder 10 there is a shaft 21 having one bearing in the end plate of the cylinder 22 and the other bearing in the spider 23. Said shaft extends through the plate 21 outside of the cylinder and has keyed thereon the pulleys 24 and 25. The pulley 25 is driven by the belt 26 from the pulley 27 mounted on the drive shaft 28, and the pulley 24 drives the belt 18 above described. The shaft 28 is mounted on the outside of the cylinder and extends laterally therewith supported in the bearings 29 and 30. Said shaft is driven by the bevel gears 31 which are in turn driven by the main drive pulley 32 through the shaft 33. Mounted upon the shaft 21 within the feeding cylinder 10, there is a spiral screw 34 extending longitudinally thereof and of slightly smaller diameter than said cylinder. Upon the feeding of the material into the hopper 11, and the rotation of the feeding plates 19 and the spiral screw 34 of the driving mechanism, the material is forced forwardly toward the left hand of the cylinder, as shown in Fig. 1.

Secured to the end of said chamber there is a housing 34ª enclosing the feed chamber 35 into which the end of the shaft 21 extends, having mounted thereon the blades 36 for further forcing the paste into the plate upon it being forced into the chamber 35 by the spiral screw 34. Said chamber 35 is closed at one end by the grid passage formed of two guide panels between which the empty grids 37 are fed. Adjacent the chamber 35 there is a solid wall 38 forming the upper portion of one side of the guide, and a perforated wall 39 forming the lower portion thereof. On the other side of the guide there is a perforated wall 40 forming the upper portion thereof and a solid wall 41 forming the lower portion. The paste is forced by the blades 36 through side passageways 42 into the chamber 43 positioned upon the opposite side of the guide from the chamber 35. This chamber is enclosed by the end casing 44 through which extends the shaft 45 having feeding blades 46 on the end thereof so positioned as to force the paste contained in the chamber 43 through the perforated wall portion 40 into the interstices of the grid as it passes by. Therefore, as the grid is fed into the machine, the paste is forced therein from the left side through the perforations 40 and as it passes on and comes opposite the perforated portion 39, the paste is forced from the right hand side of the grid. It will thus be observed that the paste is forced into the grid from first one side and then the other. The size of the perforations in the portions 39 and 40 may be varied to obtain the best results, or the perforation of the guide may be eliminated altogether, leaving only a frame for properly guiding the grid and permitting free access thereto on the respective sides. The shaft 45 is driven by the bevel gears 47 which in turn are driven by the shaft 33 from the main drive pulley 32.

The empty grid plates 37 are fed into the machine between the guide walls 38 and 40 by the friction rollers 48 and 49 which are maintained in frictional relation therewith by yielding means adjusted by the screws 50. The roller 48 is driven by the belt 51 from the pulley 52 mounted on the shaft 33. As the plates are passed through the machine between the guides, they are discharged at the lower end thereof between the rollers 53 and 54, the roller 54 being driven by the belt 55 driven by the pulley 56 mounted on the shaft 33. The roller 54 carries an endless fabric belt 56 passing about the roller 58, 59 and 60. The roller 54 and the fabric belt are driven at a higher speed than the movement of the plate so as to cause any surplus of paste thereon to be cleanly wiped from the surface, the roller 53 being adapted to force such excess paste through the grid to be wiped off by the belt. Mounted within the endless belt 57 there are a plurality of paper rolls 61 which carry rolls of blotting paper passing from the roller 54 between the surfaces thereof and the belt so as to take up any moisture which may be squeezed from the paste, carrying the same past the roller 58 until the paper engages the guide plate 62 which is so curved and positioned as to cause the paper to turn off and be discharged as waste, as shown in Fig. 3. For further eliminating any dampness or water from the fabric belt, said belt passes through a wringer, comprising the rollers 63 which are spring pressed together within the frame 64.

From the above description of the device, it will be apparent that whereas heretofore paste has been mechanically fed into battery plate grids from one side only, which does not satisfactorily press the paste into the plate on the opposite side, this invention contemplates feeding paste in from both sides so that it will be quickly and uniformly positioned therein. Furthermore, whereas, the grid plates after being filled have been scraped of any surplus paste, this invention contemplates wiping off the surplus paste rather than scraping the same, at the same time absorbing to an appreciable extent the moisture or water therein and compressing the paste within the interstices.

The invention claimed is:

1. A pasting machine for battery grids, including a feeding chamber, means in said chamber for feeding the paste towards the grid, and means for forcing the paste into said grid from the opposite side thereof, said means being so arranged that the paste will be forced into said grid, first from one side and then from the other side.

2. A paste machine for battery grids including a feed chamber, means in said chamber for feeding the paste to the grid, means for forcing the paste into the grid from the opposite side thereof, and means for preventing the paste from being forced from one side of said grid therethrough to the other side thereof.

3. A pasting machine for battery grids including a feed chamber, means in said chamber for forcing the paste into said grid from one side thereof, a chamber positioned on the other side of said grid, means in said last mentioned chamber for forcing paste into the adjacent side of said grid, and means mounted adjacent thereto for preventing the paste from being forced from one chamber to the other chamber through said grid.

4. A paste machine for battery grids including a guide for the passage of grids therethrough to be filled, said guide comprising walls having a passageway therebetween for said grid, each of said walls having a plurality of perforations through which the paste may pass to said grid, a chamber positioned on each side of said walls having a communicating passage therethrough, and means for forcing paste into said grid from said chambers through the respective perforations.

5. A pasting machine for battery grids including a roller mounted in position to engage one side of the grid as it passes through said machine for finishing off the surface thereof, absorbent material adapted to pass about said roller for absorbing moisture from said plate, and means for deflecting said absorbent material for discharging it from said machine after having been used.

6. A pasting machine for battery grids including means for finishing the surface of the grids after being pasted, comprising a plurality of rollers between which said grid is adapted to pass so that each side thereof will be frictionally and forcibly engaged, a fabric material associated with one of said rollers for cleansing and finishing the surface of said plate, and an absorbent medium associated therewith for absorbing and delivering the moisture therefrom.

7. A pasting machine for battery grids, including means for finishing the surface of the grids after being pasted, comprising a plurality of rollers between which said grid is adapted to pass so that each side thereof will be frictionally and forcibly engaged, an endless fabric belt adapted to pass about one of said rollers so as to engage the surface of said grid whereby the surface thereof will be cleansed and finished, and a strip of absorbent paper adapted to pass about said roller with said belt for absorbing and delivering the moisture from said grid.

8. A pasting machine for battery grids, including means for finishing the surface of the grids after being pasted, comprising a plurality of rollers between which said grid is adapted to pass so that each side thereof will be frictionally and forcibly engaged, an endless fabric belt adapted to pass about one of said rollers so as to engage the surface of said grid whereby the surface thereof will be cleansed and finished, a strip of absorbent paper adapted to pass about said roller with said belt for absorbing and delivering the moisture from said grid, and means for delivering the absorbent paper from said machine after having been used thereon.

9. A pasting machine for battery grids, including means for finishing the surface of the grids after being pasted, comprising a plurality of rollers, one of said rollers being in position to frictionally engage said plate, an endless fabric belt adapted to pass about one of said rollers so as to engage the surface of said grid whereby the surface thereof will be cleansed and finished, and an absorbent paper arranged to pass about said engaging roller with said fabric belt for absorbing and carrying off the moisture in said grid.

In witness whereof, I have hereunto affixed my signature.

JESSE E. S. SHEPHERD.